United States Patent
Nakamura et al.

(10) Patent No.: US 6,599,641 B1
(45) Date of Patent: Jul. 29, 2003

(54) STRUCTURAL BODY FORMED BY FRICTION STIR WELDING OF HOLLOW EXTRUDED FRAME MEMBERS

(75) Inventors: Hideyuki Nakamura, Kudamatsu (JP); Takeshi Kawasaki, Kudamatsu (JP); Toshiaki Makino, Kudamatsu (JP); Yoshihiko Ina, Kudamatsu (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/716,371

(22) Filed: Nov. 21, 2000

(30) Foreign Application Priority Data

Jan. 27, 2000 (JP) .......................................... 2000-018262

(51) Int. Cl.⁷ ................................................ B32B 3/30
(52) U.S. Cl. ........................ 428/593; 428/598; 428/599
(58) Field of Search ................................ 428/598, 599, 428/654, 582, 593, 595

(56) References Cited

U.S. PATENT DOCUMENTS

| | | | | |
|---|---|---|---|---|
| 5,697,511 A | * | 12/1997 | Bampton | .................... 220/4.12 |
| 6,050,474 A | * | 4/2000 | Aota et al. | ................... 156/73.5 |
| 6,051,325 A | * | 4/2000 | Talwar et al. | ............. 228/112.1 |
| 6,193,137 B1 | * | 2/2001 | Ezumi et al. | ............. 228/112.1 |
| 6,250,037 B1 | * | 6/2001 | Ezumi et al. | ............... 52/592.1 |
| 6,273,323 B1 | * | 8/2001 | Ezumi et al. | ............. 228/112.1 |
| 6,276,591 B1 | * | 8/2001 | Kawasaki et al. | ....... 228/112.1 |
| 6,321,975 B1 | * | 11/2001 | Kawasaki et al. | ....... 228/112.1 |
| 6,354,483 B1 | * | 3/2002 | Ezumi et al. | ............. 228/112.1 |

FOREIGN PATENT DOCUMENTS

| | | | |
|---|---|---|---|
| EP | 0797043 A2 | * | 9/1997 |
| EP | 0893189 A2 | * | 1/1999 |
| EP | 0893190 A2 | * | 1/1999 |
| JP | 2000-263251 | * | 9/2000 |

* cited by examiner

*Primary Examiner*—John J. Zimmerman
(74) *Attorney, Agent, or Firm*—Antonelli, Terry, Stout & Kraus, LLP

(57) ABSTRACT

End portions of face plates 21 and 22 of a hollow extruded frame member 20 are connected with a rib 24 and these end portions are welded to end portions of face plates 11 and 12 of a hollow extruded frame member 10 using friction stir welding. A visible outline of a connection portion of the end portion of the face plate 21 and the rib 24 is constituted by circular arcs 31 and 32 which are recessed in the hollow extruded frame member 20. A visible outline of a connection portion of the end portion of the face plate 22 and the rib 24 is constituted by circular arcs 33 and 34 which are recessed in the hollow extruded frame member 20. The diameter of the circular arc 31 (33) is smaller than the diameter of the circular arc 32 (34). Accordingly, a structural body having a light weight structure can be obtained.

10 Claims, 3 Drawing Sheets

STRUCTURAL BODY FORMED BY FRICTION STIR WELDING OF HOLLOW EXTRUDED FRAME MEMBERS

BACKGROUND OF THE INVENTION

The present invention relates to a structural body and to a hollow extruded frame member on which friction stir welding is carried out. For example, the invention relates to a railway vehicle, a building structure and others structures which are formed at least in part using aluminum alloy hollow extruded frame members that are joined using friction stir welding.

Friction stir welding is a method in which, by rotating a round rod (called "a rotary tool"), inserting the rotating rod into a welding portion, and moving the rotary tool along a welding line of a hollow extruded frame member, the welding portion is heated, softened and plastically fluidized and is solid-stately welded.

The rotary tool used in friction stir welding is comprised of a small diameter portion, which is inserted into the welding portion during welding, and a large diameter portion, which is positioned mainly outside of the welding portion during welding and is integrated with the small diameter portion of the rotary tool. The small diameter portion and the large diameter portion of the rotary tool have the same axis. A boundary between the small diameter portion and the large diameter portion of the rotary tool is inserted a little into the welding portion during welding.

The above-stated technique is disclosed, for example, in Japanese application patent laid-open publication No. Hei 9-309164 (EP 0797043 A2).

One difference between friction stir welding and arc welding is that, in friction stir welding, insertion of the rotary tool into the welding portion causes a large load to be applied to the hollow extruded frame members during welding. This load acts mainly in the insertion direction (an axial center direction) of the rotary tool. In other words, this insertion force of the rotary tool acts directly on the hollow extruded frame members to be subjected to welding.

When a hollow extruded frame member, having two face plates and ribs for connecting the two face plates, is subjected to friction stir welding, the above-stated insertion force acts on the face plate in an area surrounding the welding portion and the rib for connecting the face plates, causing the joint portion to deform. As a result, it is necessary to take steps to prevent such a deformation of the joint portion.

A deformation prevention means is disclosed in the above-referenced Japanese application patent laid-open publication No. Hei 9-309164 (EP 0797043 A2). This deformation prevention means is based on the provision, in the area of the welding portion, of a vertical plate (called a longitudinal rib) for connecting the two face plates. This longitudinal rib, which serves as one of ribs for connecting the two face plates, is arranged with respect to the welding line so as to be disposed on an axial center of the rotary tool. With this method, since the longitudinal rib supports the above-stated insertion force, the deformation of the joint portion can be prevented.

However, since a large load acts concentrically on the longitudinal rib, a high stress is generated at the connection portion of the longitudinal rib with the face plate, at which point the generated stress concentration exists. As a result, there is fear that the force will be sufficient to destroy the longitudinal rib.

As one means for preventing damage to the longitudinal rib, there is a method in which a visible outline of the connection portion between the longitudinal rib and the face plate is formed with a circular arc having a large diameter, which connection portion is recessed inside of the hollow extruded frame member, causing the longitudinal rib and the face plate to be connected smoothly, so that the stress concentration on the connection portion between the longitudinal rib and the face plate is spaced out.

However, the larger the diameter of the above-stated circular arc is, the more the cross-sectional area of the joint portion increases, and, accordingly, the weight of the joint portion increases. For these reasons, in the above-stated method, there is a limitation on the light weight characteristic of the hollow extruded frame member. In other words, there is a limitation on the light weight characteristic of the structure of the structural body which is comprised of these hollow extruded frame members.

SUMMARY OF THE INVENTION

An object of the present invention is to provide a structural body and a hollow extruded frame member, in which a light weight structure in the form of a member having two face plates and ribs for connecting the two face plates can be attained.

The above-stated object can be attained by a structural body comprising a first member having two face plates in the form of sheets, the one of the two face plates and the other of the two face plates being connected by a rib, and a second member which is subjected to friction stir welding to a connection portion of the other of the two face plates of the first member and the rib. At least one visible outline of a connection portion of the rib and a respective one of the two face plates is comprised of a curved line which is recessed in a solid side of the first member, the curved line being constituted by a combination of two continuous circular arcs, and within the two circular arcs, the diameter of the circular arc joined to a side of the said face plate is smaller than the diameter of the circular arc joined to a side of the rib.

DESCRIPTION OF THE INVENTION

Figure 3:
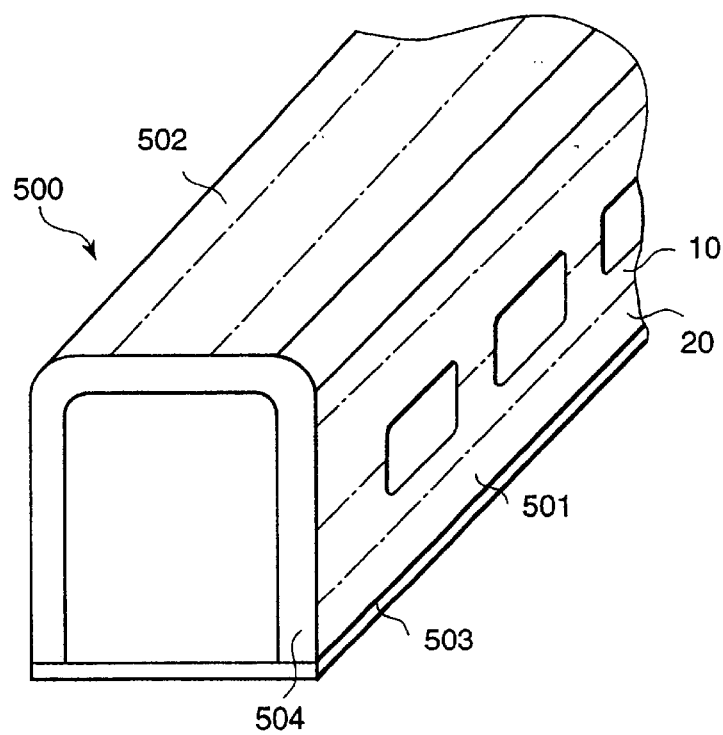
FIG. 3 is a perspective view of a railway vehicle having a structural body representing one embodiment according to the present invention.

A structural body according to one embodiment of the present invention will be described with reference to FIG. 1 to FIG. 3. As seen in FIG. 3, a railway vehicle structural 500 is comprised of a side structure 501 constituting a side face of the vehicle, a roof structure 502 constituting a roof of the vehicle, a stand frame 503 constituting a floor of the vehicle, and an end structure 504 constituting an end portion of the vehicle, as seen in a longitudinal direction. Each of the side structure 501, the roof structure 502 and the stand frame 503 is constituted by welding together plural extruded frame members. The longitudinal direction of each extruded frame member extends in the longitudinal direction of the railway vehicle 500.

Each extruded frame member is a hollow extruded frame member made of an aluminum alloy. The structure of hollow extruded frame members 10 and 20 constituting the side structure 501 will be explained. Other portions and other structures are similar to the side structure 501.

The hollow extruded frame member 10 is comprised of two sheet face plates 11 and 12 in the form of sheets and plural ribs 13 and 14 connecting the two face plates 11 and 12. The hollow extruded frame member 20 is comprised of two face plates 21 and 22 in the form of sheets and plural ribs 23 and 24 connecting the two face plates 21 and 22.

The connection portion between the rib 24 at an end of the hollow extruded frame member 20 and the face plates 21 and 22 has respective recessed portions which form seats to support the protruding end portions 25 and 26 of the hollow extruded frame member 10, and these seats have projection chips 25a and 25a, which are projected in a direction toward the adjacent hollow extruded frame member 10 to provide each seat with an extended support surface.

The two face plates 11 and 12 are disposed substantially in parallel. The ribs 13 are arranged in a truss structure, and the pitch of the truss structure is uniform. On the other hand, the rib 14 is substantially orthogonal to the two face plates 11 and 12. The two face plates 21 and 22 are also disposed substantially in parallel. The ribs 23 are arranged in a truss structure, and the pitch of the truss structure is uniform. The rib 24 is substantially orthogonal to the two face plates 21 and 22.

The plate thickness of the rib 24 at the end portion of the hollow extruded frame member 20 is thicker than the plate thickness of other ribs 13, 14 and 23.

The end portions of the face plates 11 and 12 are supported on the seats via the protruding end portions 25 and 26, respectively. The protruding end portions 25 and 26 of the face plates 11 and 12 are butted against the end portions of the face plates 21 and 22. The butted portion is subjected to the friction stir welding. The end portion of the face plate 21 is positioned within the range of an extension line of the thickness of the rib 24 at the end portion. The end face of the face plate 21 is substantially orthogonal to the planar surface of the face plate 21. The end portion of the face plate 22 is positioned within the range of an extension line of the thickness of the rib 24 at the end portion. The end face of the face plate 22 is substantially orthogonal to the planar surface of the face plate 22.

Next, details of the structure of the connection portion between the face plates 21 and 22 and the rib 24 will be explained. The visible outline of the connection portion between the face plate 21 and the rib 24 is constituted by a smooth curved line formed on one side of the rib 24 by a succession of circular arcs 31 and 32 and a smooth curved line formed on the other side of the rib 24 by a succession of circular arcs 33 and 34. The visible outline of the connection portion between the face plate 22 and the rib 24 is similarly constituted by a smooth curved line formed on one side of the rib 24 by the circular arcs 31 and 32 and a smooth curved line formed on the other side of the rib 24 by the circular arcs 33 and 34.

The circular arcs 31 and 32 form a connection line between one face of the rib 24 and the face plate 21. The circular arcs 33 and 34 form a connection line between the other face of the rib 24 and the projection chip 25a. The circular arcs 31, 32, 33 and 34 are recessed in a solid side of the hollow extruded frame member 20.

The circular arcs 31 and 32 are also provided to form a connection line between one face of the rib 24 and the face plate 22. The circular arcs 33 and 34 are also provided to form a connection line between the other face of the rib 24 and the projection chip 26a. The circular arcs 31, 32, 33 and 34 are recessed in a solid side of the hollow extruded frame member 20.

Namely, the surface of the circular arc 31 and the surface of the circular arc 32 form a smooth connection line, and the surface of the circular arc 31 and the surface of the circular arc 32 are recessed in the solid side of the hollow extruded frame member 20. Thus, the circular arcs 31 and 32 are recessed in a connection point of the rib 24.

The diameter of the circular arc 31 which joins a side of the face plate 21 is smaller than the diameter of the circular arc 32 which joins a side of the rib 24, and the diameter of the circular arc 33 which joins a side of the projection chip 25a is smaller than the diameter of the circular drc 34 which joins the side of the rib 24. Further, the projection chip 25a can be considered to be a part of the face plate 21.

The diameter of the circular arc 31 which joins a side of the face plate 22 is smaller than the diameter of the circular arc 32 which joins a side of the rib 24, and the diameter of the circular arc 33 which joins a side of the projection chip 26b is smaller than the diameter of the circular arc 34 which joins the side of the rib 24. Further, the projection chip 26a can be considered to be a part of the face plate 22.

During the friction stir welding operation, the portion where the two hollow extruded frame members 10 and 20 are abutted is aligned with the axial center of a rotary tool 50. Accordingly, a large load in an axial direction of the rotary tool 50 acts concentrically on the rib 24. As a result, a high stress is generated at a position near the rib 24.

In embodiment according to the present invention, the visible outline of the connection portion between the end portions of the face plates 21 and 22 and the rib 24 is constituted by a smooth line constituted by circular arcs which are recessed in the side of the hollow extruded frame member 20. Within the visible outline of the connection portion between the end portions of the face plates 21 and 22 and the rib 24, which represents a position of high stress generation, since the diameters of the circular arcs 32 and 34 at the side of the rib 24 are formed so as to be large, the stress concentration of the connection portion between the end portions of the face plates 21 and 22 and the rib 24 is spread out, so that the stress per unit area becomes small.

On the other hand, since the diameters of the circular arcs 31 and 33 which join with the side of the face plate 21 and the side of the projection chip 25a, respectively, are formed so as to be small, the cross-sectional areas of these portions become small. As stated above, since the visible outline is constituted by two circular arcs, the cross-sectional area of the joint portion becomes small, and, accordingly, the weight of the joint portion becomes small.

Since the diameters of the circular arcs 31 and 33 which join with the side of the faceplate 22 and the side of the projection chip 26a, respectively, are formed so as to be small, the cross-sectional areas of these portions become small. As stated above, since the visible outline is constituted by two circular arcs, the cross-sectional area of the joint portion becomes small, and, accordingly, the weight of the joint portion becomes small.

As an alternative, it is possible for the circular arc of the connection portion between the face plates 21 and 22, the projection chips 25a and 26a and the rib 24 to be in the form of one large circular arc (a single smooth circular arc having only one large diameter). With this construction, the generation of stress can be equal to the generation of stress of the above-stated embodiment according to the present invention. Accordingly, in this alternative configuration, the cross-sectional area of this portion becomes large, but a weight reduction in the structural body can not be attained.

In the above-stated embodiment according to the present invention, the welding of the two connection portions of the hollow extruded frame members 10 and 20 is carried out according to friction stir welding, although the welding may include both friction stir welding and arc welding.

In the above-stated embodiment according to the present invention, the welding of the hollow extruded frame members 10 and 20 is carried out according to butted friction stir welding, however overlap friction stir welding also can be employed.

In the above-stated embodiment according to the present invention, the face plates 11 and 12 and the face plates 21 and 22 are parallel, however the invention is also applicable to a case in which one face plate is inclined with respect to another face plate.

Figure 1:
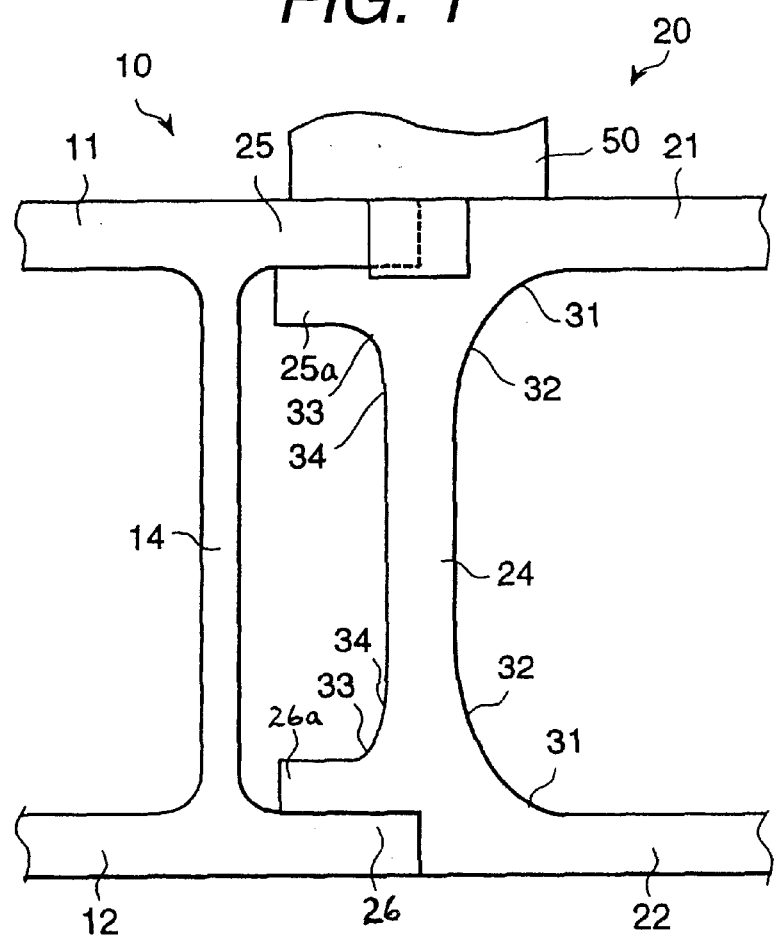
FIG. 1 is a longitudinal cross-sectional view showing a welding portion of a structural body representing one embodiment according to the present invention.
Figure 2:
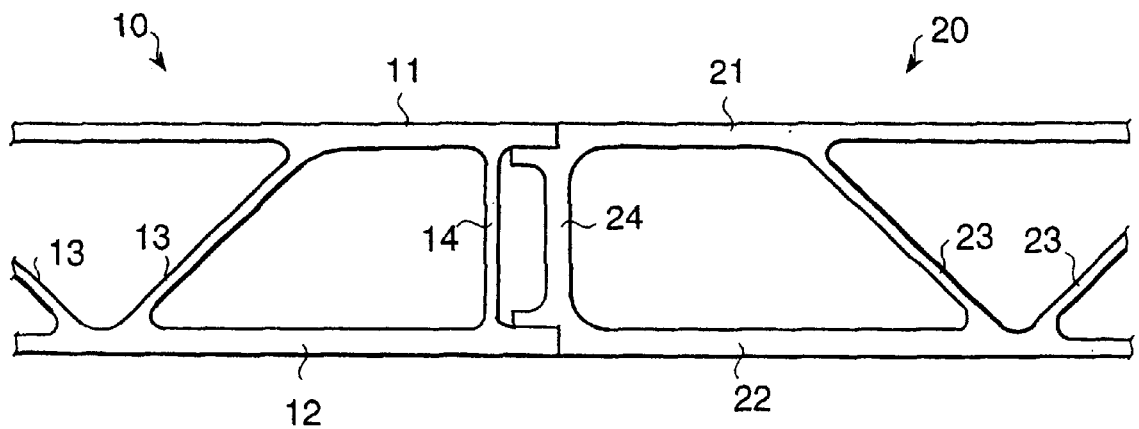
FIG. 2 is a longitudinal cross-sectional view showing the vicinity of the welding portion of a structural body representing one embodiment according to the present invention.
Figure 4:
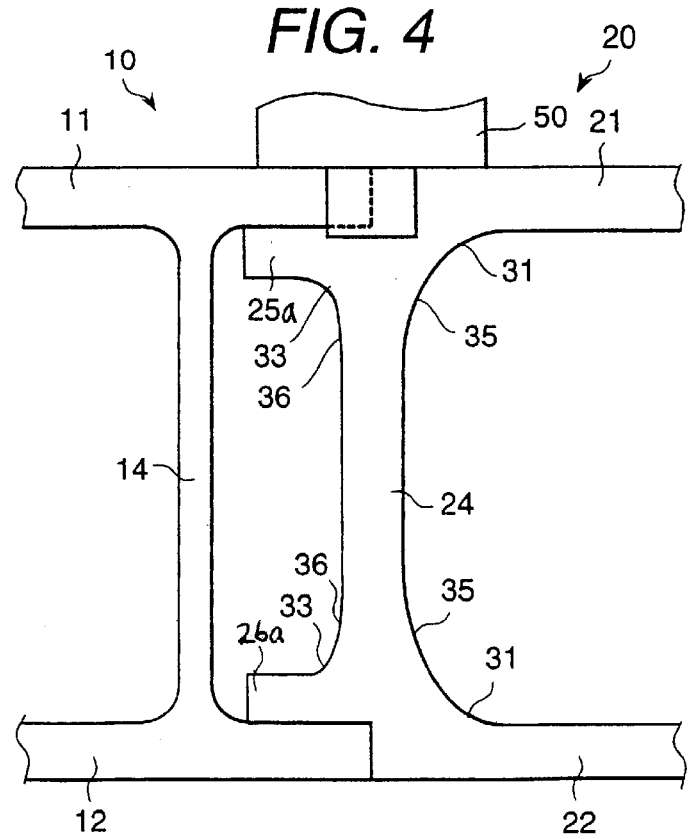
FIG. 4 is a longitudinal cross-sectional view showing a welding portion of a structural body representing another embodiment according to the present invention.

Another embodiment according to the present invention, as shown in FIG. 4, represents an example in which the diameters of the circular arcs 32 and 34 of the embodiment according to the present invention shown in FIG. 1 are indefinite. In other words, in this embodiment, the portions corresponding to the circular arcs 32 and 34 comprise a linear line. The linear lines 35 and 36 of this embodiment according to the present invention are inclined relative to the rib 24. Other parts of this embodiment according to the present invention are similar to those of the embodiment shown in FIG. 1.

Figure 5:
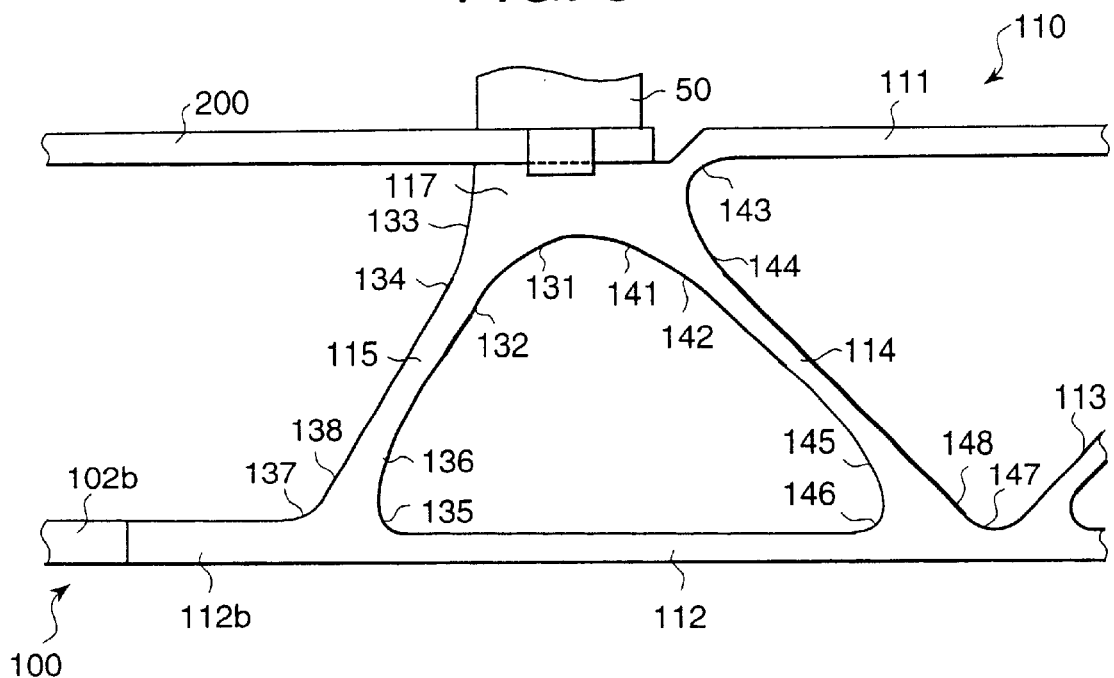
FIG. 5 is a longitudinal cross-sectional view showing a welding portion of a structural body representing a further embodiment according to the present invention.
Figure 6:
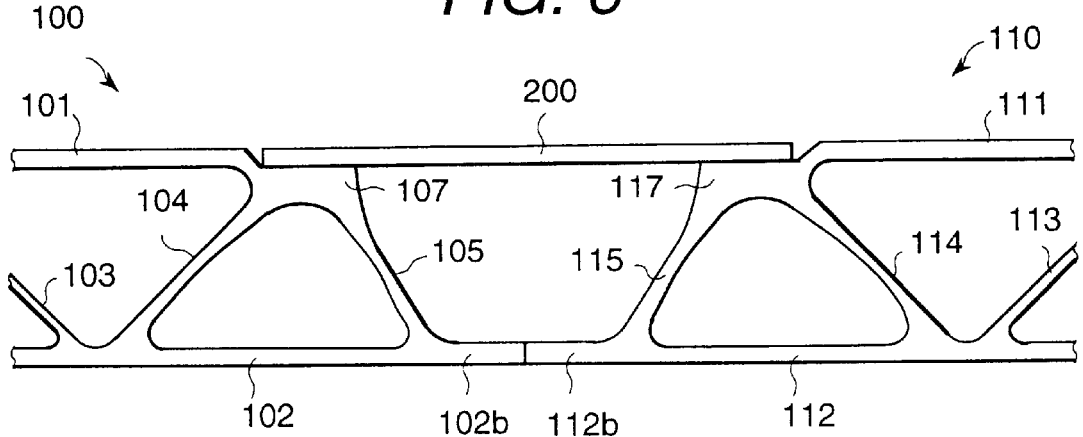
FIG. 6 is a longitudinal cross-sectional view showing the vicinity of the welding portion of the structural body representing another embodiment according to the present invention.

Another embodiment according to the present invention will be explained with reference to FIG. 5 and FIG. 6. In this embodiment according to the present invention, the rib of the end portion forms one of the truss structures. In the vicinity of an apex of this truss structure, the friction stir welding is carried out. One rib constituting the truss structure bears the main force of the friction stir welding. Accordingly, on the two ribs, the above-stated circular arcs are employed.

The hollow extruded frame member 100 comprises two face plates 101 and 102 and plural ribs 103, 104 and 105. The hollow extruded frame member 110 comprises two face plates 111 and 112 and plural ribs 113, 114 and 115 for connecting the face plates 111 and 112.

The face plates 101 and 102 are substantially parallel. The end portion of the face plate 102 at an outer side of the car projects toward the adjacent hollow extruded frame member 110 beyond the end portion of the face plate 101. The face plates 111 and 112 are substantially parallel. The end portion of the face plate 112 at an outer side of the car projects toward the adjacent hollow extruded frame member 100 beyond the end portion of the face plate 111. The projected face plate ends 102b and 112b are butted and are welded using friction stir welding from an upper portion (an inner side of the car).

The ribs 103, 104 and 105 are inclined relative to the two face plates 101 and 102 and are arranged to form a truss structure. At the intersecting point (at the apex of the truss structure) between the rib 105 at the end portion and the rib 104, a recessed portion is formed. This recessed portion forms a seat 117 for mounting a connection plate 200. One end of the connection plate 200 is overlapped on the seat 107. This overlapped portion is welded by friction stir welding using the rotary tool 50. The ribs 113, 114 and 115 are inclined relative to the two faceplates 111 and 112 and are arranged to form a truss structure. At the intersecting point (a the apex of the truss structure) between the rib 115 at the end portion and the rib 114, a recessed portion is formed. This recessed portion forms a seat 117 for mounting the connection plate 200. The other end of the connection plate 200 is overlapped on the seat 117. This overlapped portion is welded by friction stir welding using the rotary tool 50.

The plate thicknesses of the ribs 104 and 105 are thicker than the plate thicknesses of other ribs 103. The inclination angle of the rib 105 relative to the face plate 102 is larger than the inclination angle of the rib 104. Accordingly, the plate thickness of the rib 105 is larger than the plate thickness of the rib 104. The plate thicknesses of the ribs 114 and 115 are thicker than the plate thicknesses of other ribs 113. The inclination angle of the rib 115 relative to the face plate 112 is larger than the inclination angle of the rib 114. Accordingly, the plate thickness of the rib 115 is larger than the plate thickness of the rib 114.

The welding procedure used in the manufacture of the structural body will be explained. The hollow extruded frame members 100 and 200 are mounted on a bed stand so that the face plate ends 102b and 112b of the face plates 102 and 112 are butted. With hollow extruded frame members 100 and 200 in this condition the rotary tool 50 is inserted from above into the butted portion and friction stir welding is carried out.

Next, the connection plate 200 is mounted on the seats 107 and 117, and the end portion thereof is subjected to preliminary fixture welding to the face plates 101 and 111. This preliminary fixture welding is carried out intermittently along the welding line.

Next, from the upper portion (the inner side of the car), the rotary tool 50 is inserted into one end of the connection plate 200 to weld it by friction stir welding to the seat 107. The insertion position of the rotary tool 50 is in the vicinity of the position of the intersecting point (the position of the apex of the truss structure) of the two ribs 104 and 105.

Next, from the upper portion (the inner side of the car), the rotary tool 50 is inserted to the other end of the connection plate 200 to weld it by friction stir welding to the seat 117. The insertion position of the rotary tool 50 is in the vicinity of the position of the intersecting point (the position of the apex of the truss structure) of the two ribs 114 and 115.

Next, the detailed constructions of the connection portion between the end portion of the face plate 111 and the rib 115 and the connection portion between the face plate 112 and the rib 115 will be described.

The visible outline of the connection portion between the end portion of the face plate 111 and the rib 115 is in the form of a smooth curved line constituted by the circular arcs 131 and 132 and a smooth curved line constituted by the circular arcs 133 and 134. The circular arcs 131, 132, 133 and 134 are recessed at the solid side of the hollow extruded frame member 110. The diameter of the circular arc 131 is smaller than the diameter of the circular arc 132, and the diameter of the circular arc 133 is smaller than the diameter of the circular arc 134.

The visible outline of the connection portion between the face plate 112 (112b) and the rib 115 is in the form of a smooth curved line constituted by the circular arcs 135 and 136 and a smooth curved line constituted by the circular arcs 137 and 138. The circular arcs 135, 136, 137 and 138 recessed at the solid side of the hollow extruded frame member 110. The diameter of the circular arc 135 is smaller than the diameter of the circular arc 136, and the diameter of the circular arc 137 is smaller than the diameter of the circular arc 138.

The visible outline of the connection portion between the end portion of the face plate 111 and the rib 114 is in the form of a smooth curved line constituted by the circular arcs 141 and 142 and a smooth curved line constituted by the circular arcs 143 and 144. The circular arcs 141, 142, 143 and 144 are recessed at the solid side of the hollow extruded frame member 110. The diameter of the circular arc 141 is smaller than the diameter of the circular arc 142, and the diameter of the circular arc 143 is smaller than the diameter of the circular arc 144.

The visible outline of the connection portion between the face plate 112 and the rib 114 is in the form of a smooth curved line constituted by the circular arcs 145 and 146 and a smooth curved line constituted by the circular arcs 147 and 148. The circular arcs 145, 146, 147 and 148 are recessed at the solid side of the hollow extruded frame member 110. The diameter of the circular arc 145 is smaller than the diameter of the circular arc 146, and the diameter of the circular arc 147 is smaller than the diameter of the circular arc 148.

The construction of the hollow extruded frame member 100 is similar to the construction of the hollow extruded frame member 110.

With the above-stated construction, since the visible outline of the connection portion of the face plate 111 (112) and the ribs 114 and 115 is constituted of a smooth curved line in which a circular arc forms a recess at the solid side of the hollow extruded frame member 110, and the diameter of the circular arc at the high stress generation position is large, the stress can be spaced out and the stress per unit area can be small. Accordingly, the weight of the joint portion becomes small.

Further, since the insertion-force of the rotary tool 50 in this embodiment according to the present invention is supported by the two ribs 114 and 115, which are arranged at the axial center of the rotary tool 50, in comparison with the construction of the embodiment of FIG. 1, in which the insertion force of the rotary tool 50 is supported by only one rib, the plate thickness of the ribs 114 and 115 can be thinner and a hollow extruded frame member having a light weight structure can be obtained.

In the above-stated embodiment according to the present invention, the welding of the three connection portions of the hollow extruded frame members 100 and 110 is carried out using friction stir welding, although the welding of one portion or two portions can be effected using arc welding.

In the above-stated embodiment according to the present invention, the welding of the welding portion of the hollow extruded frame member 100 and 110 and the flat plate 200 (the connection plate) is carried out according to overlap friction stir welding, however it is also possible to employ butt friction stir welding.

In the above-stated embodiment according to the present invention, the welding of the welding portion of the hollow extruded frame member 100 and 110 is carried out by butt friction stir welding, however it is also possible to employ overlap friction stir welding.

In the above-stated embodiment according to the present invention, the face plates 101 and 102 and the face plates 111 and 112 are parallel, however the invention can be applied to a case in which one face plate is inclined with respect to another face plate.

The technical range of the present invention is not limited to the disclosed embodiments or the described means for solving the problems of the prior art, but includes a range which would be apparent to the man of ordinary skill in this technical field.

According to the present invention, are improved weight characteristic of a structural body, in the form of a member having two face plates and ribs for connecting the face plates, can be obtained.

What is claimed is:

1. A structure body, characterized in that the structure body comprises a first member having two sheet face plates and one of said two sheet face plates and another of said two sheet face plates being connected by a rib, a second member joined to the first member, with the joining being carried out according to a friction stir welding to a connection portion of said one of said two sheet face plates of said first member and said rib;

at least one visible outline lines of a connection portion of said rib and a respective one of said two sheet face plates is comprised of a curved line which is recessed in a solid side of said first member:

said curved line is constituted by a combination of two continuous circular arcs; and within said two circular arcs, a diameter of said circular arc of a side of said face plate is smaller than a diameter of said circular arc of a side of said rib.

2. A structure body according to claim 1, characterized in that a visible outline of a connection portion of said one sheet face plate to another side of said rib to which said two circular arcs are arranged is comprised of a curved line which is recessed in the solid side of said first member;

said curved line is constituted by a combination of two continuous circular arcs; and within said two circular arcs, a diameter of said circular arc of a side of said face plate is smaller than a diameter of said circular arc of a side of said rib.

3. A structure body according to claim 1, characterized in that said two circular arcs are arranged in a visible outline line of all of connection portions of said two sheet face plates and said respective ribs, to which friction stir welding has been carried out.

4. A structure body, characterized in that the structure body comprises a first member having two sheet face plates and one of said two sheet face plates and another of said two sheet face plates being connected by a rib, a second member joined to said first member, with the joining being carried out according to a friction stir welding to a joining portion of said one of said two sheet face plates of said first member and said second member;

at least one visible outline lines of a connection portion of said rib and a respective one of said two sheet face plates of said first member is comprised of a curved line which is recessed in a solid side of said first member;

said curved line is arranged in a side of said one of said two sheet face plates of said first member;

said curved line is connected to a linear line which is inclined in a side face of said rib;

said one of said two sheet face plates of said first member has a horizontal line which is connected to said curved line; and said rib has a perpendicular line with said horizontal line of said one of said two sheet face plates of said first member and is connected to said linear line which is inclined in a side face of said rib.

5. A structure body according to claim 1, wherein the two sheet face plates of the first member are connected by a plurality of ribs, and wherein said rib at said connection portion is thicker than others of said plurality of ribs, not at said connection portion.

6. A structure body according to claim 1, wherein said curved line is a smooth curved line.

7. A structure body according to claim 1, further comprising another connection portion between the other of the two sheet face plates of the first member and said rib.

8. A structure body according to claim 7, wherein said second member is also joined by friction stir welding to said first member, at said another connection portion, wherein at least one visible outline lines of said another connection portion of said rib and the other of the two sheet face plates is comprised of another curved line which is recessed in a solid side of said first member, said another curved line being constituted by a combination of two continuous circular arcs; and within the two circular arcs of said another curved line, a diameter of the circular arc adjacent a side of the other sheet face plate is smaller than a diameter of the circular arc adjacent a side of the rib.

9. A structure body according to claim 8, wherein the second member also includes two sheet face plates and ribs therebetween; and wherein respective sheet face plates of the first and second members are joined by the friction stir welding.

10. A structure body according to claim 7, wherein the second member also includes two sheet face plates and ribs therebetween; and wherein respective sheet face plates of the first and second members are joined by the friction stir welding.

* * * * *